April 28, 1942.　　　I. COWLES　　　2,280,892
DETACHABLE HOSE COUPLING
Filed Nov. 25, 1938　　　2 Sheets-Sheet 1
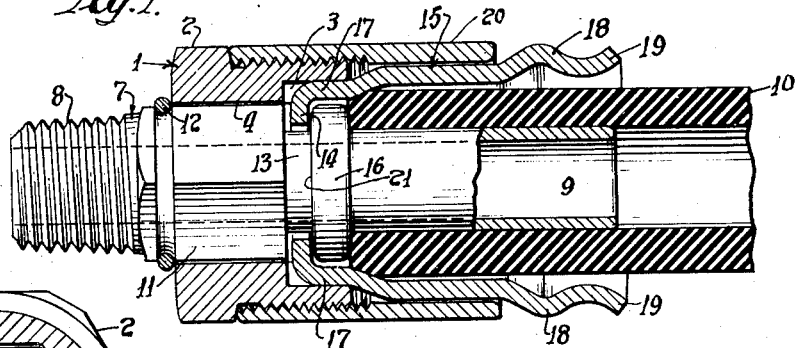
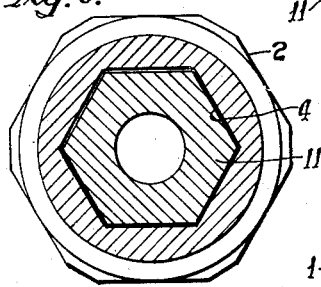
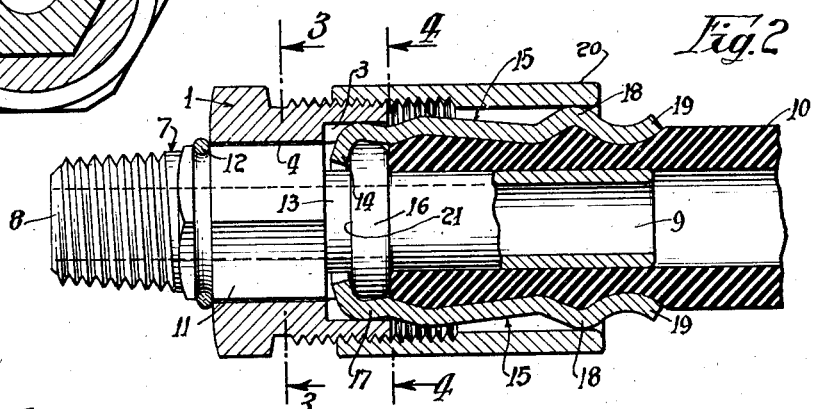
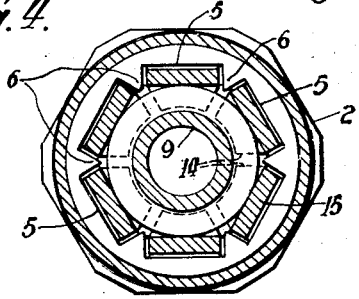
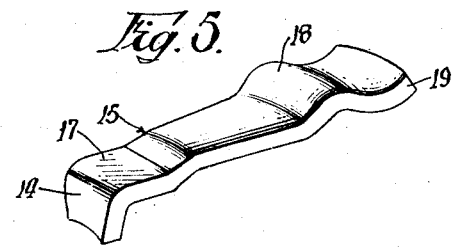
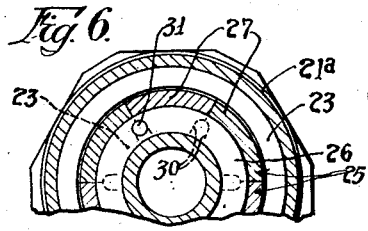
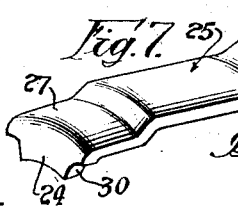
Inventor:
Irving Cowles,
By: Rudolph Wm Lotz
Attorney.

April 28, 1942.                I. COWLES                2,280,892
                    DETACHABLE HOSE COUPLING
                 Filed Nov. 25, 1938        2 Sheets-Sheet 2
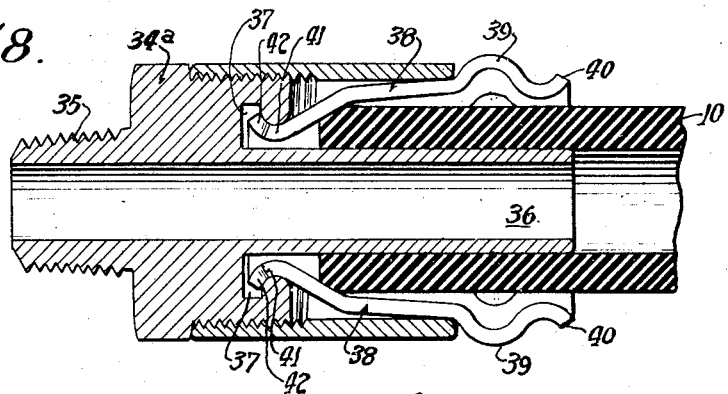
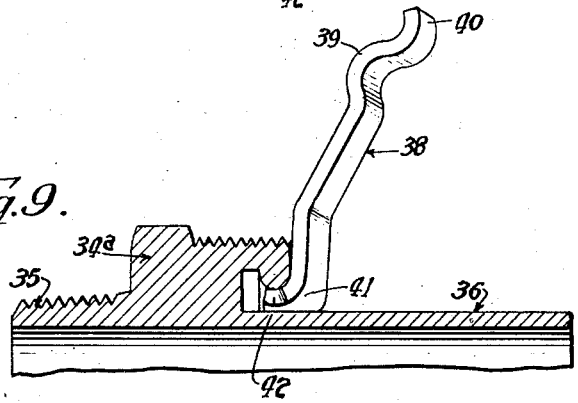
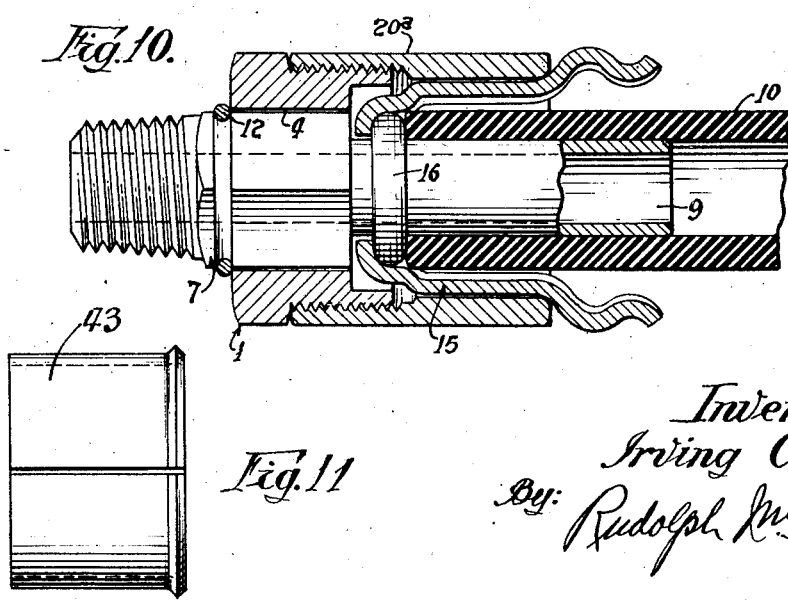
Inventor:
Irving Cowles, Patented Apr. 28, 1942

2,280,892

UNITED STATES PATENT OFFICE 2,280,892

DETACHABLE HOSE COUPLING

Irving Cowles, Detroit, Mich., assignor to said Cowles and Rudolph W. Lotz, Chicago, Ill., as successor cotrustees of Utility Patents Trust Application November 25, 1938, Serial No. 242,305

7 Claims. (Cl. 285—86)

This invention has for its object to provide a detachable hose coupling possessing many novel and advantageous characteristics with respect to efficiency, simplicity, low cost of production, interchangeability of parts to fit hoses of different internal diameters and effecting variations in the specific type of means employed to compress the hose together with employment of different types of shells, and with respect to dimensions and weight, all as hereinafter particularly pointed out.

A suitable embodiment of the invention is illustrated in the accompanying drawings, wherein Fig. 1 is a central longitudinal sectional view partly in elevation, of a hose coupling constructed in accordance with the invention.

Fig. 2 is a sectional view similar to Fig. 1 showing the operative parts of the coupling in another position.

Fig. 3 and Fig. 4 are transverse sectional views of the coupling taken on the lines 3—3 and 4—4, respectively, of Fig. 2.

Fig. 5 is a perspective view of one of the hose compressing fingers of the coupling.

Fig. 6 is a fragmentary cross-sectional view similar to Fig. 4 illustrating a modification in a detail of construction of the coupling.

Fig. 7 is a perspective view of one of the hose compressing fingers shown in Fig. 6.

Fig. 8 is a view similar to Fig. 1 illustrating a modified form of construction of the coupling.

Fig. 9 is a fragmentary longitudinal sectional view of the body member of the coupling, showing one of the hose compressing fingers of the type shown in Fig. 8 in the initial position from which it is turned to the position shown in Fig. 8 to engage it with the body member.

Fig. 10 is a view similar to Fig. 1 showing a smaller diameter hose and a thicker shell than the similar elements of Fig. 1.

Fig. 11 is a side elevation of a split sleeve adapted to be inserted in the shells of the devices shown in Figs. 1, 2, 8 and 10 to effect thickening thereof.

The coupling of the present invention comprises a body member 1 which is externally polygonal at one end, as shown at 2, and the other end portion of which is externally threaded. In the last-named end portion of said body member there is provided a pocket 3 which is of greater lateral dimensions than the minimum diameter of the hexagonal axial bore 4 of said coupling and is disposed at one end of said bore, as clearly shown in Fig. 2. The said pocket 3 is provided with a substantially hexagonal inner peripheral wall, the flat faces 5 of which are preferably parallel with those of the bore and are alternated with inwardly extending ribs 6 which may be V-shaped, as shown.

The axial bore 4 may be of any shape other than shown as long as same is non-circular in cross section. The peripheral wall of said pocket 3 constitutes a terminal flange of the body member 1.

A stem member 7 equipped at one end with a threaded nipple 8 and at its other end with a tubular formation 9 adapted to be inserted into an end portion of a hose 10, has a middle or intermediate portion 11 of cross sectional contour substantially identical with that of the bore 4, but is of slightly smaller dimensions than the latter and fits loosely into said bore to allow said stem member some lateral play within the said bore. The shape of the portion 11 of the stem member 7 may be varied to correspond with the selected shape of the bore 4 and fit the same sufficiently snugly to limit its rotation relatively to the body member to a very short arc.

Adjacent one end of said portion 11 of the stem member 7, there is provided a peripheral groove to receive a split collar 12 of wire or the like. At the other end portion of said portion 11 there is provided a peripheral recess 13 adapted to receive the flanges 14 at the inner ends of the hose compressing fingers 15. The portion 16 of the stem member lying between the said recess 13 and the tubular element 9 constitutes an annular collar which is rendered substantially cylindrical with its corner edges curved to provide a continuous peripheral or annular surface which is substantially convex in longitudinal section and constitutes a fulcrum upon which the leg 17 of the terminal flange of each of the fingers 15 may rock. The said flange 14 and portion 17 last described, constitute substantially an L-shaped terminal formation or flange for each of said fingers 15.

Each of the fingers 15 comprises a substantially straight middle portion offset outwardly from the leg 17 of the terminal flange 16, 17 of each of the fingers and, as shown in Fig. 1, the said straight portions extend normally substantially parallel with the axis of the body member. The offsets adjacent the flange leg 17 lies in front of the end flange of the body member.

At its outer end, each of said fingers is equipped with an outwardly projecting substantially V-shaped formation 18 and with an arcuate terminal formation presenting an outwardly projecting lip 19.

Mounted upon the body member 1 and having threaded engagement therewith along one end portion is a cylindrical shell 20 which, when disposed at the inner limit of its movement with its threaded end abutting the polygonal portion 2 of the body member, encircles the straight portions of the fingers 15, the V-shaped portion 18 being then disposed in the path of the outer extremity or rim of the shell 20, so that, as the latter is rotated in the direction to cause it to move away from the formation 2, the said rim of the mouth of said shell 20 will ride over the apex of the V-shaped formation 18 and thus force the fingers into the position shown in Fig. 2, wherein they compress the end portion of the hose 10 disposed over the tubular member 9, to a very appreciable extent.

The legs 14 of the terminal flanges of the fingers 15 hold said fingers against longitudinal movement relatively to the body member 1 under the influence of the stress imparted by the last-mentioned movement of the inner end wall 21 of the pocket 3 of the body member to prevent the withdrawal of the stem member from the coupling body in one direction. Thus said fingers cooperate with the split ring 12 to prevent any appreciable longitudinal movement of the stem member relatively to the body member.

The split ring is employed exclusively for maintaining the body member 1, stem member 7, and fingers 15 in their assembled relation as illustrated in Fig. 1 during transit and handling of the coupling. When the nipple 8 of the stem member 7 is connected with a pipe and the hose 10 is connected with the tubular member 9, and is clamped upon the latter, all tension on the hose is transmitted directly to the said pipe (not shown) and thus there is no stress on the wire key 12.

Assembly of the coupling is effected by removing the split ring 12, moving the stem member to the right relatively to the body member until the recess 13 is disposed sufficiently far in advance of the right hand end of the body member to enable the flanges 14 of the fingers 15 to be inserted into said recess 13. The stem member is then moved back to the position shown in Figs. 1 and 2, whereupon the fingers are engaged against appreciable longitudinal and radial movement relatively to the coupling body and stem members at their inner ends.

The said ribs 6 provide side walls or stop formations for each of the recesses of the pocket 3 to confine the fingers 15 against rotation relatively to the body member.

By reference to Figs. 4 and 5 it will be seen that the inner end portions of the fingers 15 form a point starting substantially at the left hand end of said straight portion and continuing to the left hand end of each of the fingers, is perfectly flat in cross section, whereas the portions of said fingers disposed throughout the remainder of the length of the fingers is arcuate in cross section of a radius substantially equal to that of the hose 10.

This arcuate formation of the portions of the fingers 15 which are subject to the greatest stress are thus stiffened and rendered practically inflexible. The fingers are punched out of suitable sheet metal, but may, of course, be otherwise produced and will be varied in shape in longitudinal section to best suit them to the uses for which they are intended and adapt them for use in connection with flexible hose of various types, such as wire reinforced hose of which numerous types are on the market.

The stem members may include a series wherein the tubular end portions differ in diameter to fit the passages of hose of various internal diameters so long as the outer diameter remains substantially the same, it being obvious, further, that if the outer diameter of the hose is appreciably less than that shown, a set of fingers may be substituted for those shown which will cooperate with the tubular member 9 to effect the desired degree of compression of the hose upon the latter.

It will be obvious to those skilled in the art that the coupling of the type illustrated in Figs. 1–5 inclusive and hereinabove described, is exceedingly compact, light and strong, and that said coupling is extremely advantageous from a commercial standpoint by reason of low cost of production and interchangeability of parts, such as the stem member and fingers to adapt one size coupling for hose of different inner and outer diameters than the hose 10 illustrated, within certain limits.

As shown in Fig. 10, shells 20a having outer end portions of smaller inner diameter than the shell 20 may be substituted for the latter so that a dealer may carry in stock a series of body members 1, stem members 7 equipped with tubular members 9 of respectively different diameters, and a plurality of shells 20a of different inner diameters, together with sets of fingers 15 varied in shape to suit differences in outer diameters of hose and thus make up a coupling which is best adapted to the needs of the purchaser.

The body member 1 of Figs. 1 and 4 can be produced only by casting or forging, because of the ribs 6 and flat inner faces of the flange 3.

If it be desired to produce body members by means of screw machines, the inner face of the flange 3 must be capable of being formed by means of a lathe operation. Therefore, in Figs. 6 and 7, there is illustrated a modified form of construction wherein the terminal flange 23 of the body member 21 has an inner cylindrical face between which and the annular flange or collar 26 of the stem member, the portions 27 of the terminal L-shaped flanges of the fingers 25 are received. The portions 24 of said flanges are provided with side recesses 30. These recesses of adjacent fingers disposed edge to edge, as shown in Fig. 6, form U-shaped recesses which receive pins 31 driven into bores in the collar 26 and middle portion of the stem member to bridge the recess 23 of the latter to hold the fingers against rotation relatively to the stem and body member. Only one of said pins 31 is shown as sufficient for the purpose, but more may be provided if desired.

In producing the body members by screw machines, the axial bore of the body member is initially round and is then broached out to the polygonal shape illustrated in Fig. 3 or to any other desired cross-sectional shape.

Another modified form of construction of the coupling is illustrated in Figs. 8 and 9 wherein the body member 34a is integral with the nipple 35 and stem 36. Said body is equipped with an annular groove 37 at its stem end which is L-shaped in cross section with its portion of largest diameter projecting outwardly.

The hose compressing fingers 38 have outer end portions 39 and 40 like the portions 18 and 19 of the fingers 15, but at their other ends are equipped with what may be termed "hook-formations" 41 which engage in the groove 37 as shown in Fig. 8 said fingers being disposed in the position of Fig. 8 by removing the shell from the body member and initially positioning each of said fingers as shown in Fig. 9 and then swinging the same to said position of Fig. 8.

The terminal flanges of said fingers 38 are equipped with side recesses 42 corresponding to the recesses 30 of Fig. 7 for the same purpose as illustrated in Figs. 6 and 7 for cooperation with a pin or pins, such as the pin 31 of Fig. 6 bridging the larger diameter portion of the groove 37.

From the foregoing it will be apparent that the interchangeability of parts of the coupling extends to shells of different length, and to the fingers, to a very appreciable extent, so that the merchant carrying a stock of couplings and parts thereof, as hereinbefore illustrated, will be enabled to meet every need with a minimum investment in such stock.

Obviously, in the structures of figure, the stem member becomes a part of the body member when the split collar 12 and fingers 15 are in place and thus the said fingers are indirectly connected with the body member with the same effect as if directly connected with the latter, as shown in Fig. 8.

Of course, instead of substituting shells, such as 20a of Fig. 10, the split sleeve 43 shown in Fig. 11 may be inserted into the mouth portions of the shells or sleeves 20 of Figs. 1 and 8 to effect greater radial movement of the fingers 15 and 39 and consequently greater compression of the hose 10 upon the stems 9 and 36, respectively.

I claim as my invention:

1. A hose coupling comprising a body member equipped with an axial stem, an internally cylindrical shell concentric with the stem having threaded engagement with said body member, a series of thin relatively flat and straight fingers slightly arcuate in cross section on substantially the axis of said stem adapted to lie normally substantially in contact throughout their lengths with the inner surface of said shell while the latter is disposed at substantially the inner limit of its movement relatively to the body member, said fingers associated at their innermost end portions with said body member against longitudinal movement for movement radially of the latter into and out of compressing relation to a hose end portion disposed over said stem, said fingers equipped at their other ends with outwardly projecting formations lying in the path of the mouth of said shell when the latter is disposed at substantially the inner limit of its movement said shell causing inward movement of said fingers throughout substantially their entire lengths to compress the said hose end portion as said shell is moved away from said last-named position.

2. A hose coupling comprising a body member equipped with an axial stem, an internally cylindrical sleeve having threaded engagement with said member along one end portion, a series of sheet metal fingers having substantially straight shanks associated at their inner ends with said body member against longitudinal and rotary movement relatively thereto and normally disposed substantially throughout the lengths of said shanks in surface contact with the inner cylindrical surface of said sleeve when the latter is disposed substantially at the inner limit of its movement relatively to the body member and defining in connection with said stem a substantially cylindrical hose end receiving chamber, the outer ends of said fingers presenting bends extending radially angularly outwardly to apex points and inwardly from said apex points to points aligned substantially with the inner surfaces of the shanks of said fingers and spaced appreciably from the latter and including angularly outwardly projecting extremities, said bends being normally disposed in the path of the mouth of said sleeve for effecting inward swing of said fingers as said shell is moved outwardly from said body member, thereby to effect compression of the hose end upon the stem throughout substantially the entire length of said fingers.

3. A hose coupling comprising a body member equipped with an axial stem rigid therewith, an internally cylindrical shell having threaded engagement along one end portion thereof with said body member, a plurality of relatively flat inflexible fingers pivotally engaged at their inner ends with said body member against longitudinal movement with relation thereto and having substantially straight shank portions adapted to lie in close surface contact with the inner surface of said shell throughout the length of the latter when the same is disposed at the inner limit of its movement with respect to the body member and having outwardly projecting terminal formations opposed to the rim of the mouth of said shell when the latter is disposed in the last-named position, the crown portions of said formations being received within the shell when the latter is moved outwardly from the body member, thereby to cause the shank portions of said fingers to engage in the hose end disposed over said stem throughout substantially their entire lengths and thereby compress said hose end upon the stem.

4. A hose coupling comprising a body member, a shell concentric therewith engaged along one end portion with said body member for movement longitudinally thereof, a stem concentric with said shell rigid with said body member and of such length as to project beyond the outer end of the shell when the latter is disposed at the outer limit of its movement relatively to the body member, said shell being cylindrical internally from its mouth to a point adjacent its inner end, a collapsible substantially cylindrical sleeve composed of a plurality of relatively flat and substantially straight shanked fingers connected at their inner ends with said body member disposed equidistantly from said stem and disposed in surface contact with said shell throughout the length of their shanks when said shell is disposed at the inner limit of its movement for the reception of a hose end portion disposed over the stem and having an outer diameter to snugly fit said sleeve before the latter is collapsed, said fingers equipped at their outer end portions with substantially V-shaped formations disposed in the path of the mouth of the shell when the latter is disposed at the inner limit of its movement and within the shell when the latter is disposed at the outer limit of its movement, the said sleeve being held collapsed to smaller diameter at its outer than at its inner end to compress the hose end portion upon the stem throughout the length of the shank portions of said fingers while said shell is disposed in the last-named position.

5. A hose coupling comprising a body member, a shell concentric therewith engaged along one end portion with said body member for movement longitudinally thereof, a stem concentric with said shell rigid with said body member and of such length as to project beyond the outer end of the shell when the latter is disposed at the outer limit of its movement relatively to the body member, said shell being cylindrical internally from its mouth to a point adjacent its inner end, a collapsible substantially cylindrical sleeve composed of a plurality of relatively flat and substantially straight shanked fingers, the latter and said body member equipped with interengaging formations effecting pivotal association of said fingers with said body member while preventing rotation of said fingers about the axis of the latter and maintaining them spaced equidistantly from said stem at their inner ends, said shank portions of said fingers being disposed in surface contact substantially throughout their lengths with said shell to receive a hose end portion when said shell is disposed at the inner limit of its movement, said fingers equipped at their outer end portions with substantially V-shaped formations disposed in the path of the mouth of the shell when the latter is disposed at the inner limit of its movement and within the shell when the latter is disposed at the outer limit of its movement, the said sleeve being collapsed to smaller diameter at its outer than at its inner end to compress the hose end portion upon the stem throughout the length of the shank portions of said fingers while said shell is disposed in the last-named position.

6. A hose coupling comprising a body member, an internally cylindrical sleeve having threaded connection along one end portion with said body member, a stem rigid with the latter and concentric with said body member, a collapsible sleeve composed of a series of separate spaced apart sheet metal fingers having substantially straight shanks slightly arcuate in cross section and substantially inflexible disposed about said stem, said fingers being pivotally associated at their inner ends with said body member and against rotation about the axis of the latter and equipped at their outer ends with outwardly projecting substantially V-shaped formations disposed in the path of the mouth of the shell when the latter is disposed at the inner limit of its movement and said sleeve is fully expanded, the said straight shank portions of said fingers being then in surface contact with said shell and adapted to receive a hose end portion, the said sleeve being collapsed by outward movement of said shell to a position encircling the apex portion of said formations of said fingers and thereby causing the latter to compress the hose end portion upon the stem throughout the length of said fingers, the latter being then convergent toward their outer ends, said V-shaped formations terminating in outwardly projecting lips engaged partially in the hose end about the outer end portion of the stem when said sleeve is collapsed.

7. In a hose coupling, a body member equipped with an axial stem, an externally threaded front end portion and a polygonal flange bordering and projecting outwardly beyond said threaded portion, an internally cylindrical, externally polygonal sleeve equipped with a flared mouth engaged along its rear end with said threaded portion, an inner contractible shell composed of a series of spaced apart, flat inflexible fingers including straight main portions, outwardly projecting inclined end portions constituting cam formations, and inwardly offset inner end portions equipped with transversely extending short terminal flanges, the latter and the immediately proximate portions of said fingers constituting male formations engaged with female means in the forward end of the body member to pivotally engage said fingers loosely with the latter for appreciable radial movement and swing of the body portions of said fingers radially of said sleeve, the inner ends of said cam formations lying in substantial engagement with said flared mouth and said straight finger portions lying in contact with the sleeve when the latter is disposed at the inner limit of its movement and a hose-end portion is disposed over said stem within said shell whereby responsively to outward movement of said sleeve said fingers will move inwardly in convergent relation to each other.

IRVING COWLES.